United States Patent
Brendler et al.

(10) Patent No.: US 7,853,345 B2
(45) Date of Patent: *Dec. 14, 2010

(54) OFFSET DETERMINATION METHOD FOR MEASUREMENT SYSTEM MATCHING

(75) Inventors: Andrew C. Brendler, LaGrangeville, NY (US); Danielle R. Chianese, Poughkeepsie, NY (US); Susan M. Jankovsky, Beacon, NY (US); Roger M. Young, Warwick, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 11/862,414

(22) Filed: Sep. 27, 2007

(65) Prior Publication Data

US 2008/0015815 A1     Jan. 17, 2008

Related U.S. Application Data

(63) Continuation of application No. 11/163,009, filed on Sep. 30, 2005, now Pat. No. 7,318,206.

(51) Int. Cl.
| | |
|---|---|
| G06F 19/00 | (2006.01) |
| G06F 17/50 | (2006.01) |
| G05B 13/02 | (2006.01) |
| G06Q 40/00 | (2006.01) |
| G01B 5/28 | (2006.01) |
| G01C 17/38 | (2006.01) |
| G01R 31/26 | (2006.01) |

(52) U.S. Cl. .................. 700/95; 700/51; 700/117; 716/4; 324/765; 705/40; 702/36; 702/94

(58) Field of Classification Search .............. 716/4; 702/36, 94, 179; 700/51, 95, 117; 324/765; 705/40

See application file for complete search history.

(56) References Cited

U.S. PATENT DOCUMENTS

| | | | |
|---|---|---|---|
| 5,128,737 | A | 7/1992 | van der Have |
| 5,642,298 | A | 6/1997 | Mallory et al. |
| 6,263,255 | B1 | 7/2001 | Tan et al. |
| 6,281,696 | B1 | 8/2001 | Voogel |
| 6,586,265 | B2 | 7/2003 | Chiou et al. |
| 2002/0171586 | A1 | 11/2002 | Martorana et al. |
| 2003/0160627 | A1 | 8/2003 | Muradian et al. |
| 2005/0010890 | A1 | 1/2005 | Nehmadi et al. |
| 2005/0086617 | A1 | 4/2005 | Ciplickas et al. |
| 2006/0047456 | A1 | 3/2006 | Conrad et al. |
| 2006/0277506 | A1 | 12/2006 | Stine et al. |

*Primary Examiner*—Stacy A Whitmore
(74) *Attorney, Agent, or Firm*—Katherine S. Brown; Hoffman Warnick LLC

(57) ABSTRACT

Dynamic offset determination for each of a plurality of measurement systems for matching the systems is disclosed. One embodiment uses an artifact which is periodically run across the measurement system to be matched. Inputs for each run include the current offsets and historical data for the entire fleet and the new test measurement for the current measurement system under test. Evaluation based on exponentially weighted moving average and median calculation techniques may result in a new, reset offset for one or more measurement systems. The reset offset(s) is then applied to product measurements to nullify any tool matching issues.

6 Claims, 5 Drawing Sheets

OFFSET DETERMINATION METHOD FOR MEASUREMENT SYSTEM MATCHING

This application is a continuation of application Ser. No. 11/163,009, filed Sep. 30, 2005 now U.S. Pat. No. 7,318,206, currently issued.

BACKGROUND OF THE INVENTION

1. Technical Field

The invention relates generally to measurement systems, and more particularly, to a method, system and program product to determine a dynamic offset for measurement system matching.

2. Background Art

Efficient semiconductor manufacturing requires highly precise and accurate measurement systems, i.e., metrology instruments. In particular, a measurement system is required to achieve small tolerances to achieve better quality products and fewer rejections in the manufacturing process. There are a number of challenges currently facing the industry relative to measurement systems. One challenge is correctly assessing the measurement potential of a measurement system and matching the measurement system to other measurement systems. Conventionally, when a stable artifact (NIST traceable) is not available, a plurality of measurement systems are matched by having each system test measuring a particular artifact on a monitor wafer, and then determining an offset for each measurement system from a median of all of the measurement systems test measurements. An offset is a correction value, e.g., −2.2 nm, for each measurement. A monitor wafer is a wafer used for measurement testing that includes "artifacts" or structures having a measurable dimension, e.g., thickness, thereon. Typically, artifacts on a monitor wafer are generated to represent variations in a particular semiconductor process of interest for the particular measurement system under test (MSUT). Unfortunately, it is oftentimes difficult to separate the inherent noise associated with the measurement systems data from real process excursions with a high confidence level. As a result, offsets for a measurement system are oftentimes inaccurate. One approach to address the matching problem has been to limit the measurement systems on which a critical dimension is measured during production. Even though this approach results in more uniform measurements, this solution is not desirable because it reduces throughput and increases the risk to a production line by the use of a limited number of measurement systems to support a potentially critical process.

Another challenge relative to measurement system matching is addressing changes in artifacts on monitor wafers over time, which frustrates the ability to match measurement systems. For example, in the semiconductor industry the thickness of a thin-gate oxide film on the surface of a silicon wafer is known to change over time due to environmental conditions. As a result, measurements of an artifact made of that material changes over time, and creates inaccuracies for static measurement system offsets.

In view of the foregoing, there is a need in the art for a solution to the problems presented by the related art.

SUMMARY OF THE INVENTION

Dynamic offset determination for each of a plurality of measurement systems for matching the systems is disclosed. One embodiment uses an artifact which is periodically run across the measurement system to be matched. Inputs for each run include the current offsets and historical data for the entire fleet and the new test measurement for the current measurement system under test. Evaluation based on exponentially weighted moving average and median calculation techniques may result in a new, reset offset for one or more measurement systems. The reset offset(s) is then applied to product measurements to nullify any tool matching issues.

A first aspect of the invention provides a method of determining an offset for each of a plurality of measurement systems, the method comprising the steps of: obtaining a set of test measurements of an artifact on a monitor wafer for each of the plurality of measurement systems, and a current offset for each measurement system; measuring the artifact on a measurement system under test (MSUT) to obtain a new test measurement; adding the new test measurement to the set of test measurements for the MSUT; calculating an exponentially weighted moving average (EWMA) of each measurement system based on their respective sets of test measurements; calculating for each measurement system a prime value equal to the EWMA of a respective measurement system plus the current offset of the respective measurement system; calculating a median of the prime values for the plurality of measurement systems as a group; calculating for each measurement system, a delta-to-median value equal to the prime value for the respective measurement system minus the median; and resetting the current offset for each respective measurement system to a reset offset equal to the current offset for a respective measurement system minus the delta-to-median for the respective measurement system in response to the delta-to-median value for the respective measurement system exceeding a predetermined threshold.

A second aspect of the invention provides a system for determining an offset for each of a plurality of measurement systems, the system comprising: means for obtaining a set of test measurements of an artifact on a monitor wafer for each of the plurality of measurement systems, and a current offset for each measurement system; means for measuring the artifact on a measurement system under test (MSUT) to obtain a new test measurement; means for adding the new test measurement to the set of test measurements for the MSUT; means for calculating an exponentially weighted moving average (EWMA) of each measurement system based on their respective sets of test measurements; means for calculating for each measurement system a prime value equal to the EWMA of a respective measurement system plus the current offset of the respective measurement system; means for calculating a median of the prime values for the plurality of measurement systems as a group; means for calculating for each measurement system, a delta-to-median value equal to the prime value for the respective measurement system minus the median; and means for resetting the current offset for each respective measurement system to a reset offset equal to the current offset for a respective measurement system minus the delta-to-median for the respective measurement system in response to the delta-to-median value for the respective measurement system exceeding a predetermined threshold.

A third aspect of the invention provides a program product stored on a computer-readable medium, which when executed, determines an offset for each of a plurality of measurement systems, the program product comprising: program code for obtaining a set of test measurements of an artifact on a monitor wafer for each of the plurality of measurement systems, and a current offset for each measurement system; program code for measuring the artifact on a measurement system under test (MSUT) to obtain a new test measurement; program code for adding the new test measurement to the set of test measurements for the MSUT; program code for calculating an exponentially weighted moving average (EWMA) of each measurement system based on their respective sets of test measurements; program code for calculating for each measurement system a prime value equal to the EWMA of a respective measurement system plus the current offset of the respective measurement system; program code for calculating a median of the prime values for the plurality of measurement systems as a group; program code for calculating for each measurement system, a delta-to-median value equal to the prime value for the respective measurement system minus the median; and program code for resetting the current offset for each respective measurement system to a reset offset equal to the current offset for a respective measurement system minus the delta-to-median for the respective measurement system in response to the delta-to-median value for the respective measurement system exceeding a predetermined threshold.

A fourth aspect of the invention provides a computer-readable medium that includes computer program code to enable a computer infrastructure to determine an offset for each of a plurality of measurement systems, the computer-readable medium comprising computer program code for performing the method steps of the invention.

An fifth aspect of the invention provides a business method for determining an offset for each of a plurality of measurement systems, the business method comprising managing a computer infrastructure that performs each of the steps of the invention; and receiving payment based on the managing step.

A sixth aspect of the invention provides a method of generating a system for determining an offset for each of a plurality of measurement systems, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
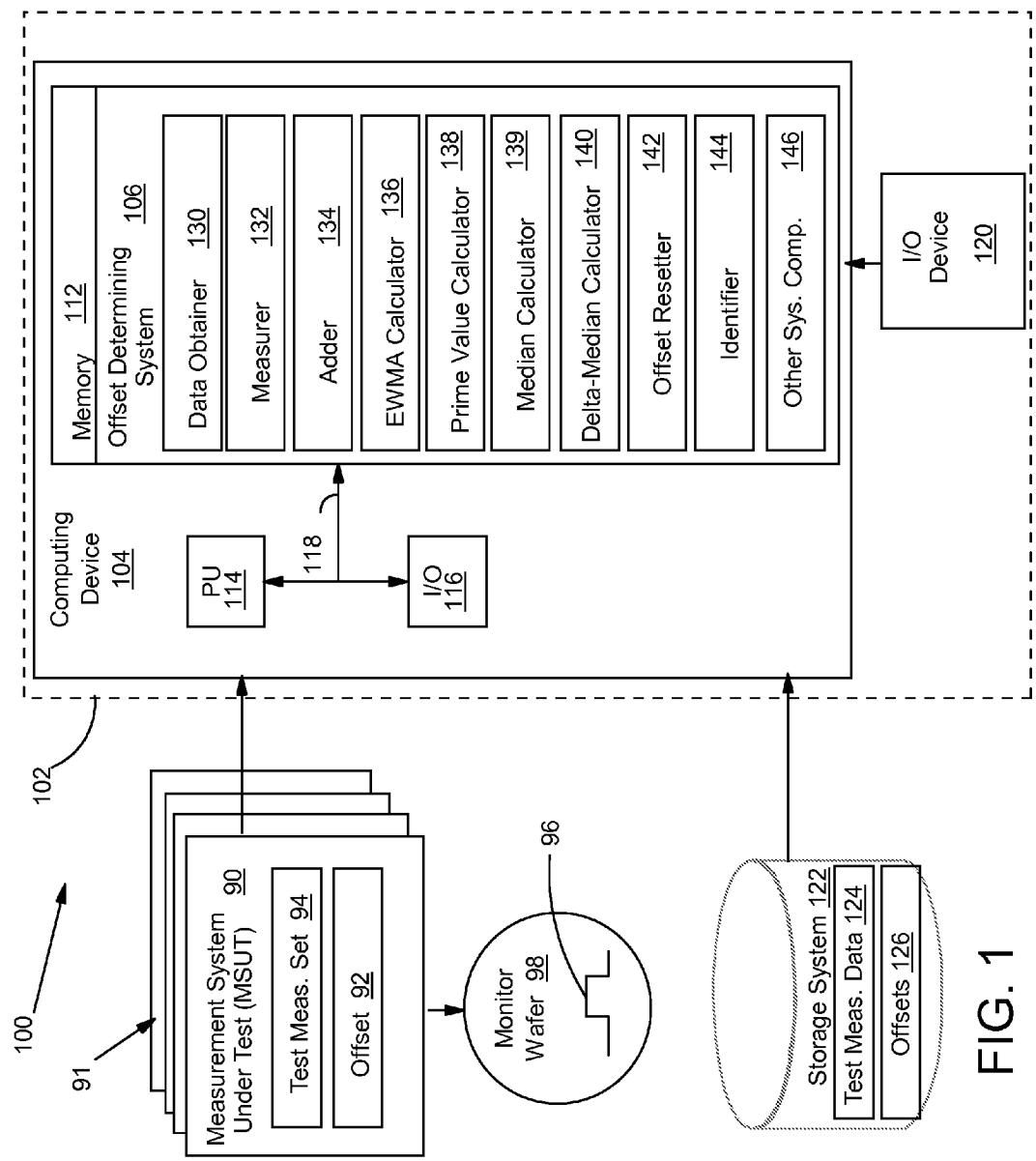
FIG. 1 shows a block diagram of an illustrative environment according to the invention.

Turning to the drawings, FIG. 1 shows an illustrative environment 100 for determining an offset for each measurement system 90 with a plurality of measurement systems 91. A particular measurement system 90 under evaluation is referred to herein as a measurement system under test (MSUT) 90. Each measurement system 90 may include one or more metrology tools such as a scanning electron microscope (SEM), atomic force microscope (AFM), etc. It should be recognized, however, that the teachings of the invention are applicable to any type of measurement system and plurality of different types of measurement systems. As shown, each measurement system 90 may include an offset 92, which establishes a correction value for each measurement the particular measurement system makes, and a set of test measurements 94 of an artifact 96 of a monitor wafer 98. As will be described below, each measurement system 90 measures an artifact 96 on a monitor wafer 98 to obtain a test measurement. As used herein, an "artifact" is a structure on monitor wafer 98 having a measurable dimension, e.g., thickness, width, etc. Monitor wafer 98 may be exposed to atmospheric environment, which may alter artifact 96 thereon.

Environment 100 includes a computer infrastructure 102 that can perform the various process steps described herein for increasing power stability in an IC. In particular, computer infrastructure 102 is shown including a computing device 104 that comprises an offset determining system 106, which enables computing device 104 to determine an offset for each of a plurality of measurement systems by performing the process steps of the invention.

Computing device 104 is shown including a memory 112, a processor 114, an input/output (I/O) interface 116, and a bus 118. Further, computing device 104 is shown in communication with an external I/O device/resource 120 and a storage system 122. As is known in the art, in general, processor 114 executes computer program code, such as offset determining system 106, that is stored in memory 112 and/or storage system 122. While executing computer program code, processor 114 can read and/or write data, such as sets of test measurement data 124 and/or offsets 126, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices.

In any event, computing device 104 can comprise any general purpose computing article of manufacture capable of executing computer program code installed by a user (e.g., a personal computer, server, handheld device, etc.). However, it is understood that computing device 104 and offset determining system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, offset determining system 106 enables computing infrastructure 102 to determine an offset for each of a plurality of measurement systems. In one embodiment, as shown, offset determining system 106 includes a program product stored in memory 112, including a data obtainer 130, a measurer 132, an adder 134, an exponentially weighted moving average (EWMA) calculator 136, a prime value calculator 138, a median calculator 139, a delta-to-median (delta-median) calculator 140, an offset resetter 142, an identifier 144, and other system components (other sys. comp.) 146. Other system components 146 may include any other peripheral functionality required for operation of system 106, but not expressly stated below. For example, a data filter to filter outliers from the raw data prior to processing. Operation of each of these functions is discussed further below. However, it is understood that some of the various functions shown in FIG. 1 can be implemented independently, combined, and/or stored in memory for one or more separate computing devices that are included in computer infrastructure 102. Further, it is understood that some of the functions may not be implemented, or additional systems and/or functionality may be included as part of environment 100.

Figure 2A:
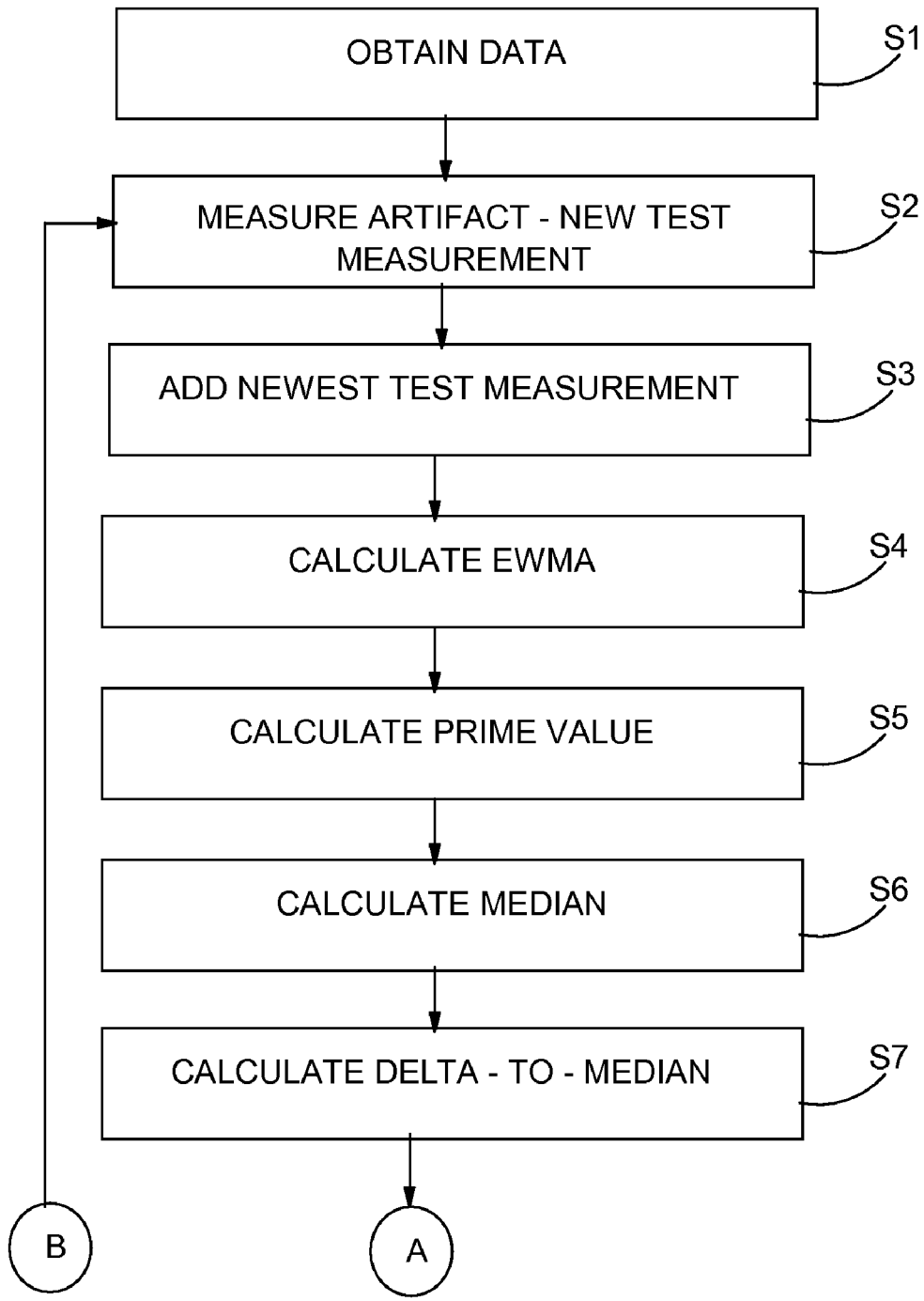
FIGS. 2A-B show a flow diagram illustrating one embodiment of a method of operation of the offset determining system of FIG. 1.
Figure 2B:
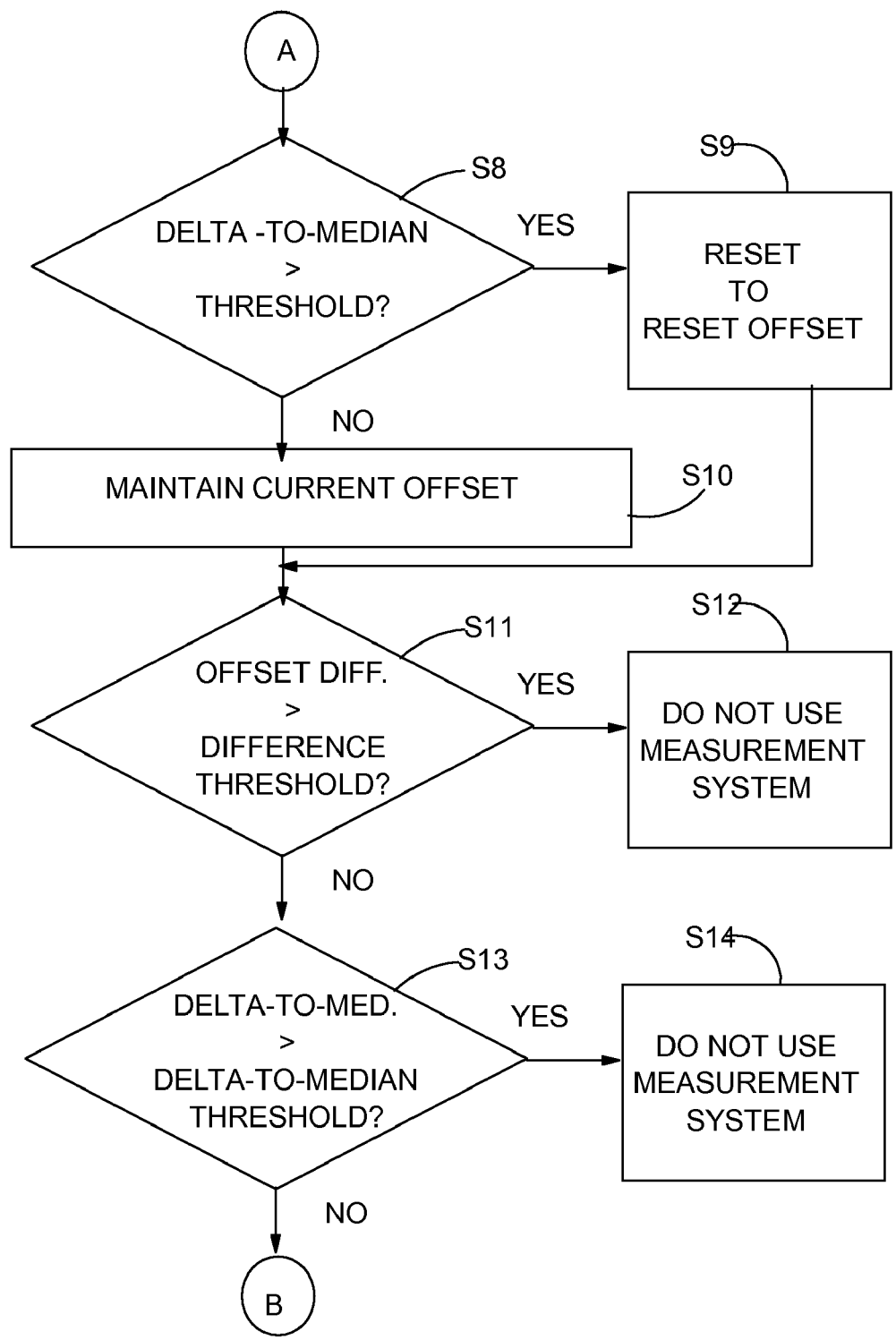

Referring to FIGS. 2A-B in conjunction with FIG. 1, one embodiment of a method of operation of offset determining system 106 will now be described. In a first step S1, data obtainer 130 obtains a set of test measurements 94 of artifact 96 on monitor wafer 98 for each of the plurality of measurement systems 90, and a current offset 92 for each measurement system 90. Data obtainer 130 may obtain this data in any now known or later developed fashion. In one embodiment, data obtainer 130 may instruct recall of this data from each measurement system 90 individually, or it may recall this data from a collective storage such as storage system 122, i.e., set of test measurement data 124 and current offsets 126. It should be recognized that the data obtaining step may be segregated, if desired. The set of test measurements 124 may include any number of test measurements considered sufficient to obtain an understanding of a measurement system's operations. In one embodiment, the set of test measurements 124 includes three test measurements.

In a second step S2, measurer 132 measures artifact 96 on the MSUT 90 to obtain a new test measurement, i.e., measurer 132 instructs the MSUT 90 to measure the artifact 96.

In a third step S3, adder 134 adds the new test measurement to the set of test measurements 124 for MSUT 90. For example, for a set of three test measurements, of which one is 4 days old, another is 3 days old and another is 2 days old, the new one that is current is added. As a result, the set of test measurements 124 would include test measurements that are 4, 3 and 2 days old and one that is current. In one preferred embodiment, each set of test measurements 124 includes at least three test measurements. The number of test measurements used, however, may be selected by a user. In addition, a user may select a maximum age of the test measurements used. Where the number of test measurements is lower than required, the artifact may be re-run multiple times as needed to obtain the minimum number of test measurements. The artifact may also be re-run multiple times following tool maintenance or an observed tool shift, etc., even if the data is not past the limit of the maximum age of data that can be used.

In a fourth step S4, exponentially weighted moving average (EWMA) calculator 136 calculates an EWMA of each measurement system based on their respective sets of test measurements 124. An EWMA is a moving average in which greater weight is given to more recent data. As a result, the EWMA represents an average that includes more recent movement, as opposed to assuming an unbiased view. For example, an EWMA may weigh a third, oldest test measurement 10%, a second oldest test measurement 30% and the first, new test measurement 60%. In this fashion, the new test measurement is given more weight than the older test measurements. In some cases, some of the test measurements, e.g., the 4 day old test measurement in the example above, may be ignored. Lambda ($\lambda$) is value that helps determine weighting factor, and may be user selected based on, for example, at least one of artifact 96 and MSUT 90. Since the details of EWMA calculation are known to those in the skill are known, no further description should be necessary.

In step S5, prime value calculator 138 calculates for each measurement system 90 a value, referred to herein as a 'prime value,' equal to the EWMA of a respective measurement system plus the current offset of the respective measurement system.

In step S6, median calculator 139 calculates a median of the prime values for all of the measurement systems in a fleet as a group, i.e., the median of all of the prime values.

In step S7, delta-to-median calculator 140 calculates for each measurement system, a delta-to-median value equal to the prime value for the respective measurement system minus the median of the prime values.

In step S8, as shown in FIG. 2B, offset resetter 142 determines whether the delta-to-median value for each respective measurement system exceeds a predetermined threshold. The predetermined threshold may be user defined and may vary depending on the type of measurement system. If the delta-to-median value exceeds the predetermined threshold, i.e., YES at step S8, then at step S9, offset resetter 142 resets the current offset for the respective measurement to a reset offset equal to the current offset for the respective measurement system minus the delta-to-median for the respective measurement system. Processing then proceeds to step S11, described below. In contrast, if the delta-to-median value does not exceed the predetermined threshold, i.e., NO at step S8, then at step S10, offset resetter 142 maintains the current offset for the respective measurement system, i.e., the offset resetter 142 does nothing. In the above-described manner, based on a test measurement for MSUT 90, the offset for each measurement system of the plurality of measurement systems 91 can be changed to maintain matching of the systems.

Steps S11-S14 represent optional steps of the method that identify any measurement systems for non-use. Steps S11-S12 and/or steps S13-S14 can be provided. Steps S11-S12 and steps S13-14 may also be switched in order. In step S11-S14, identifier 144 identifies a measurement system for non-use in response to at least one of the following: a) a difference of the current offset and the reset offset of the measurement system exceeding an offset difference threshold, and b) the delta-to-median of the measurement system exceeding a delta-to-median threshold. An offset difference may exceed the difference threshold and a delta-to-median value may exceed a delta-to-median threshold for a number of reasons such as gradual drifting from its previous calibration settings, a traumatic event such as the MSUT being moved and a variety of other reasons.

Continuing with the flow diagram, in step S11, identifier 144 determines whether a difference between the current offset and the reset offset (i.e., an offset difference) for a respective measurement system exceeds a difference threshold. The difference threshold may be any predetermined offset difference value that is considered too large for the measurement system to continue use. If the offset difference exceeds the difference threshold, i.e., YES at step S11, then at step S12, identifier 144 identifies the measurement system for non-use. As shown, if the offset difference does not exceed the difference threshold, i.e., NO at step S11 (FIG. 2B), or if steps S11-S12 are not used, processing may then proceed to: perform steps S13-S14 (FIG. 2B) or, if those steps are not provided, evaluate the next MSUT (FIG. 2A) by repeating the measuring (step S2), replacing (step S3), calculating (steps S4-S7) and resetting (steps S8-S10) for each measurement system 90 of plurality of measurement systems 91. If provided, steps S11 and S12 are repeated for each measurement system 90.

Alternatively or in addition to steps S11-S12, steps S13-S14 may be carried out. In step S13, identifier 144 determines whether a delta-to-median value for a respective measurement system exceeds a delta-to-median threshold. The delta-to-median threshold may be any predetermined delta-to-median value that is considered too large for the measurement system to continue use. If the delta-to-median exceeds the delta-to-median threshold, i.e., YES at step S13, then at step S14, identifier 144 identifies the measurement system for non-use. As shown in FIG. 2A, if the delta-to-median value does not exceed the delta-to-median threshold, i.e., NO at step S13 (FIG. 2B), or if steps S13-S14 are not used, processing may then proceed to evaluate the next MSUT (FIG. 2A) by repeating the measuring (step S2), replacing (step S3), calculating (steps S4-S7) and resetting (steps S8-S10) for each measurement system 90 of plurality of measurement systems 91. If provided, steps S13 and S14 are repeated for each measurement system 90.

As an alternative embodiment, as noted above, a user may select at least one of the following: a number of test measurements used, i.e., in a set of test measurements 124, a maximum age of the test measurements used, and a lambda value based on at least one of the artifact and the MSUT. As another alternative, the above-described methodology may also be repeated for different artifacts 96.

Figure 3:
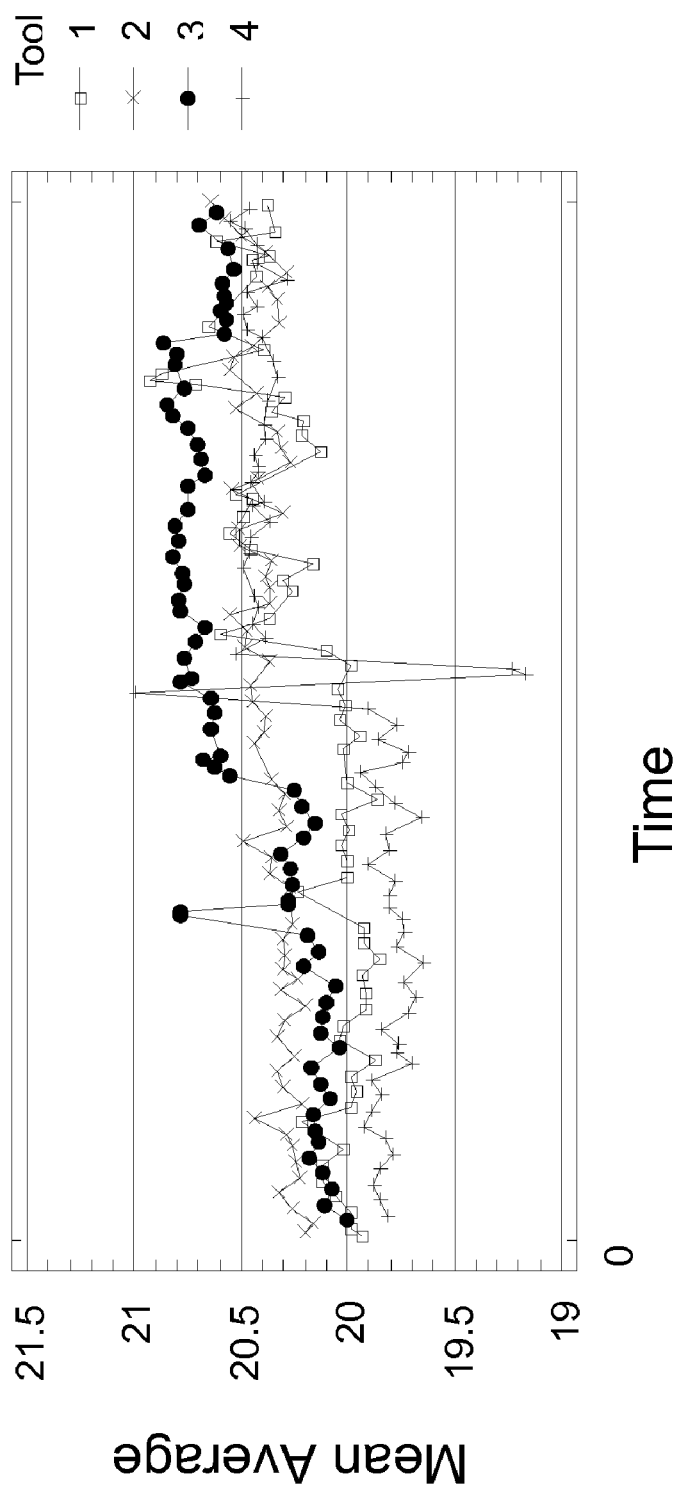
FIG. 3 shows a graph of old test measurement mean average versus time according to prior art.
Figure 4:
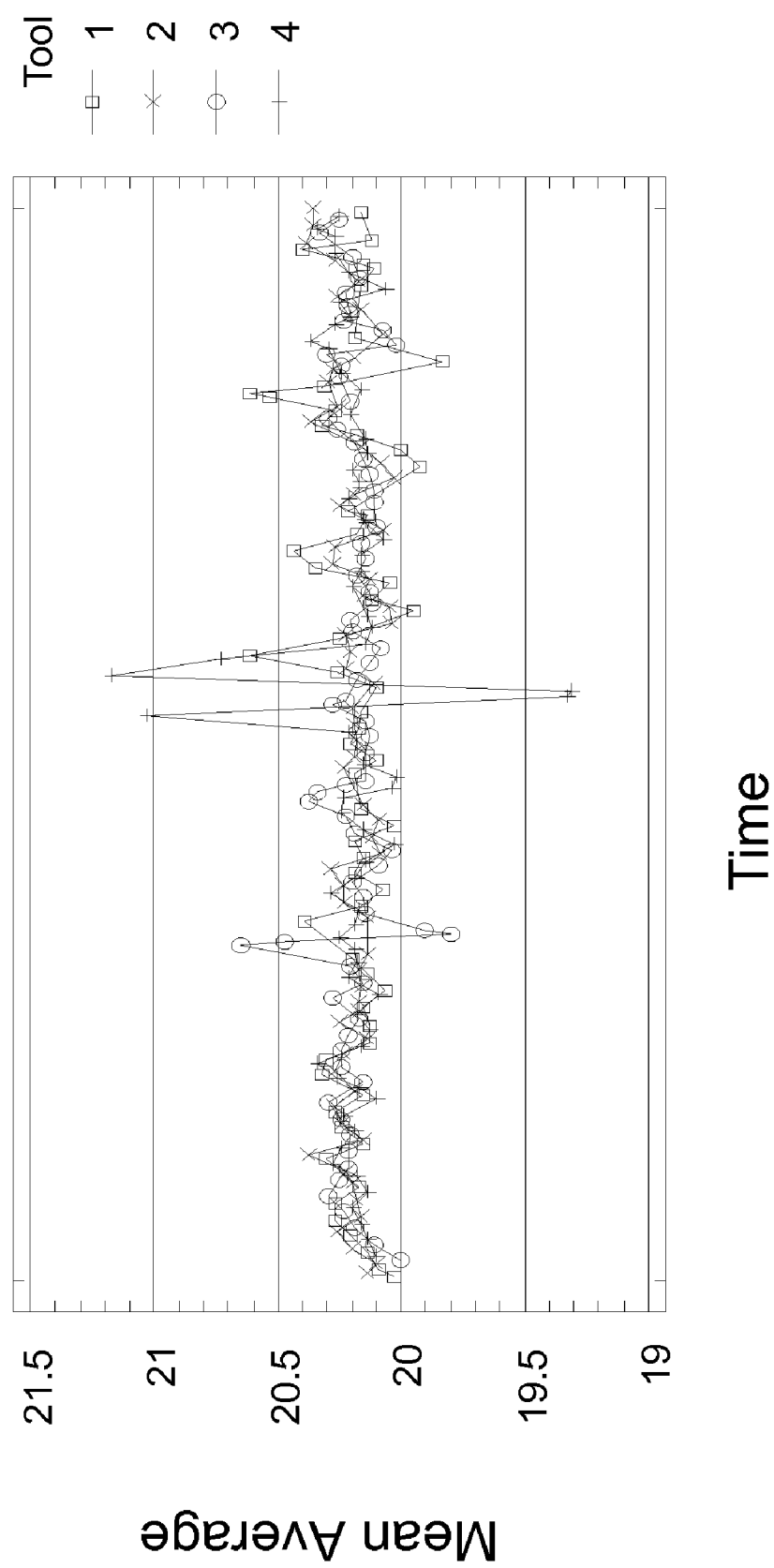
FIG. 4 shows a graph of test measurement mean average versus time according to the invention.

Turning to FIGS. 3 and 4, some of the advantages of the above-described embodiments will now be described. FIG. 3 shows a graph of mean average of test measurements versus time according to prior art for four tools. The data in FIG. 3 is based on conventional tool matching approaches. As illustrated, the mean averages of test measurements have excessive variance for each tool over time. FIG. 4 shows a graph of mean average of test measurement versus time according to the invention. As illustrated, the mean average (excepting a few flier values due to other measurement system issues) are much more clustered along a horizontal line, i.e., at approximately 20.2 nm, for each measurement system. FIG. 4 illustrates how one embodiment of the present invention compensates for long term apparent changes in artifact 96, e.g., monitor wafer gate oxide thickness variance, and allows the specification for measurement system matching to be improved upon by combining the measurement system's historical test measurement data with the offset. As a result, measurements made by a measurement system 90 are more stable over time and allow system matching. In addition, if a MSUT's measurement is shifted and a current offset becomes inaccurate, the offset is dynamically changed by resetting it to a more accurate reset offset to make the MSUT match again.

It is understood that the order of the above-described steps is only illustrative. To this extent, one or more steps may be performed in parallel, in a different order, at a remote time, etc. Further, one or more of the steps may not be performed in various embodiments of the invention.

While shown and described herein as a method and system for determining an offset for each of a plurality of measurement systems, it is understood that the invention further provides various alternative embodiments, and may be embodied in different forms of hardware and/or software. For example, in one embodiment, the invention provides a computer-readable medium that includes computer program code to enable a computer infrastructure to determine an offset for each of a plurality of measurement systems. To this extent, the computer-readable medium includes program code, such as offset determining system 106 (FIG. 1), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to determine an offset for each of a plurality of measurement systems, as described above. In this case, the service provider can manage (e.g., create, maintain, support, etc.) a computer infrastructure, such as computer infrastructure 102 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for determining an offset for each of a plurality of measurement systems. In this case, a computer infrastructure, such as computer infrastructure 102 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A business method for determining an offset for each of a plurality of measurement systems, the business method comprising:

managing a computer infrastructure that performs each of the following:

obtaining a set of test measurements of an artifact on a monitor wafer for each of the plurality of measurement systems, and a current offset for each measurement system, measuring the artifact on a measurement system under test (MSUT) to obtain a new test measurement, adding the new test measurement to the set of test measurements for the MSUT, calculating an exponentially weighted moving average (EWMA) of each measurement system based on their respective sets of test measurements, calculating for each measurement system a prime value equal to the EWMA of a respective measurement system plus the current offset of the respective measurement system, calculating a median of the prime values for the plurality of measurement systems as a group, calculating for each measurement system, a delta-to-median value equal to the prime value for the respective measurement system minus the median, and resetting the current offset for each respective measurement system to a reset offset equal to the current offset for a respective measurement system minus the delta-to-median for the respective measurement system in response to the delta-to-median value for the respective measurement system exceeding a predetermined threshold; and receiving payment based on the managing.

2. The method of claim 1, wherein the resetting further includes maintaining the current offset for the respective measurement system in response to the delta-to-median value for the respective measurement system not exceeding the predetermined threshold.

3. The method of claim 1, wherein the managing further comprises measuring, replacing, calculating and resetting for each measurement system of the plurality of measurement systems.

4. The method of claim 1, wherein the EWMA calculating includes selecting at least one of the following: a number of test measurements used, a maximum age of the test measurements used, and a lambda value based one at least one of the artifact and the MSUT.

5. The method of claim 1, wherein each set of test measurements includes at least three test measurements.

6. The method of claim 1, wherein the managing further comprises identifying a measurement system for non-use in response to at least one of the following: a) a difference of the current offset and the reset offset of the measurement system exceeding an offset difference threshold, and b) the delta-to-median of the measurement system exceeding a delta-to-median threshold.

* * * * *